Dec. 12, 1933.  W. R. VOSPER  1,938,987
PIPE TOOL
Filed July 25, 1932  2 Sheets-Sheet 1
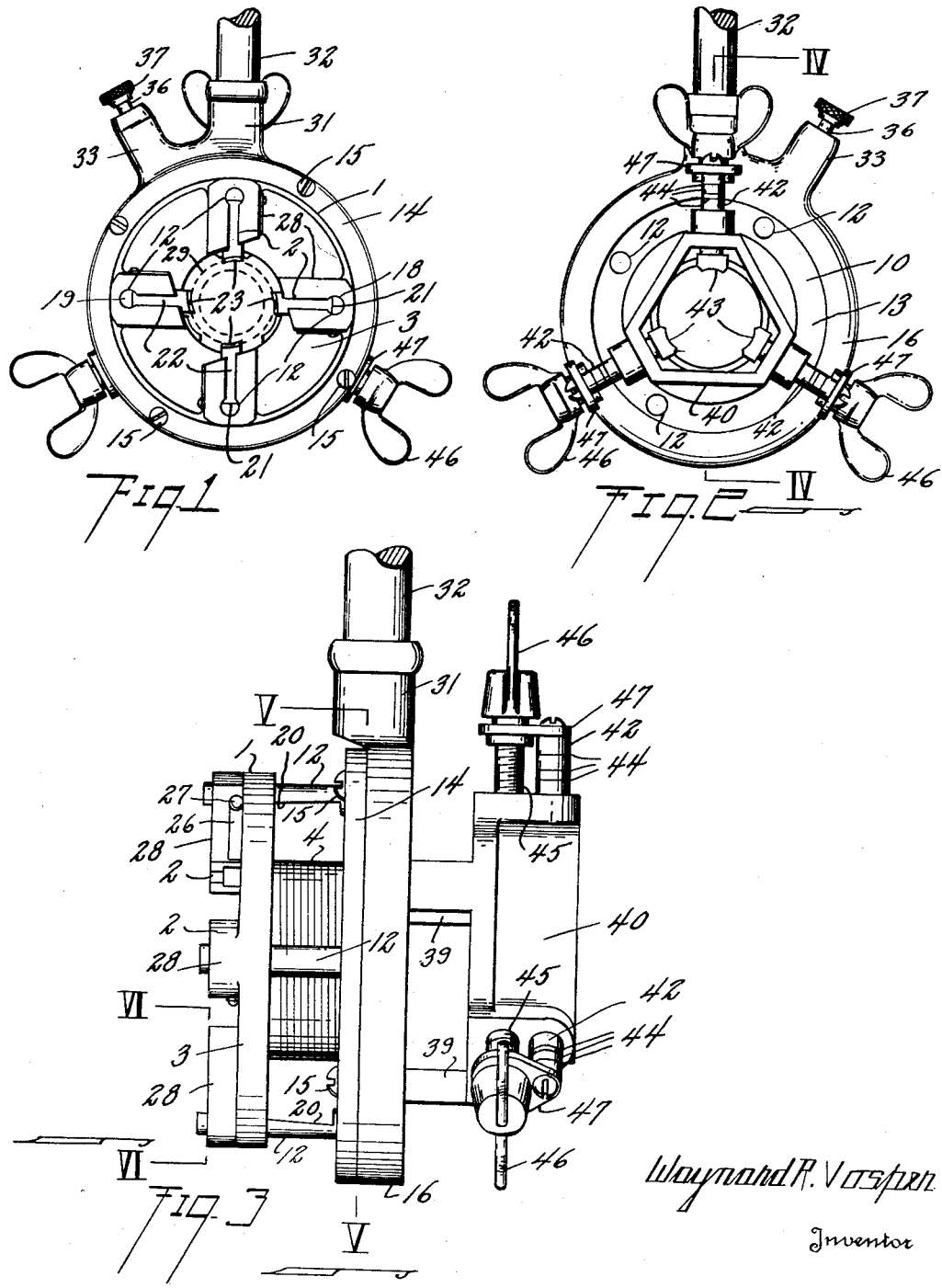
Waynard R. Vosper
Inventor Dec. 12, 1933.  W. R. VOSPER  1,938,987
PIPE TOOL
Filed July 25, 1932  2 Sheets-Sheet 2
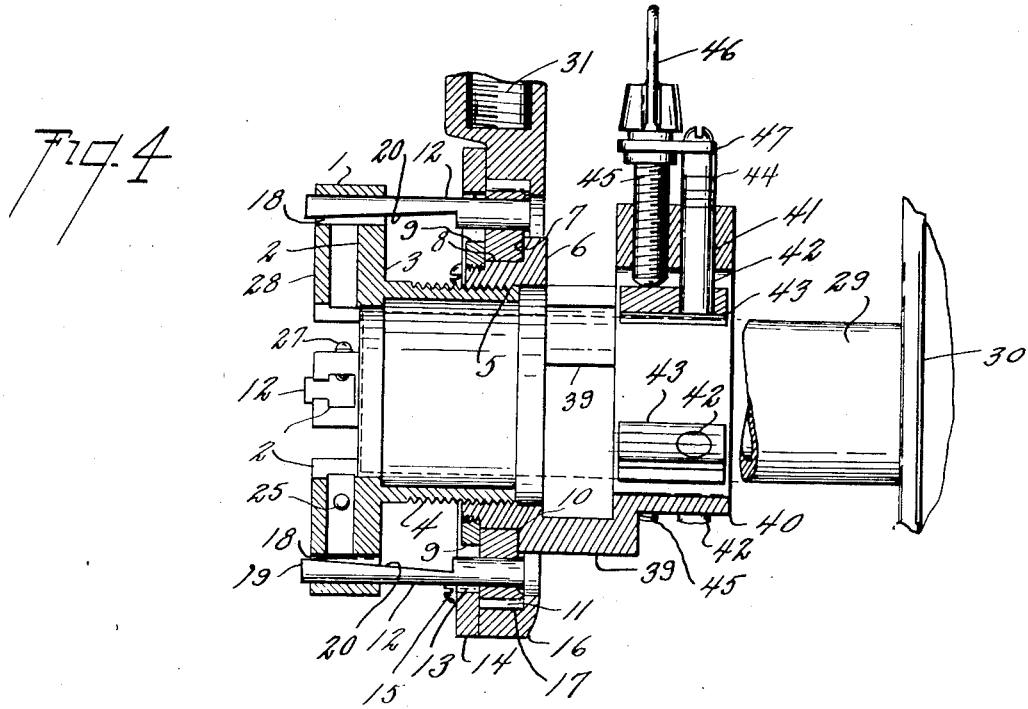
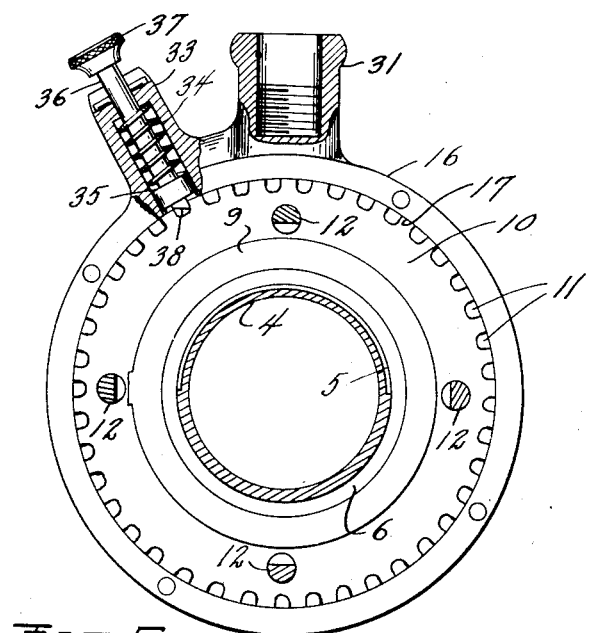
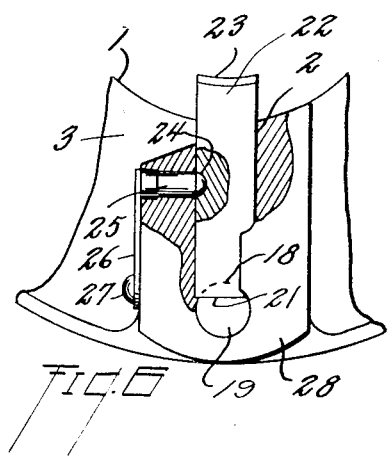
Waynard R. Vosper
Inventor Patented Dec. 12, 1933

1,938,987

UNITED STATES PATENT OFFICE 1,938,987

PIPE TOOL

Waynard R. Vosper, Toledo, Ohio, assignor to
The Toledo Pipe Threading Machine Company,
Toledo, Ohio, a corporation of Ohio Application July 25, 1932. Serial No. 624,559

5 Claims. (Cl. 10—107)

This invention relates to mounting devices for tools of relative rotation as to the work.

This invention has utility when incorporated in adjustable clamping pipe-engaging means for work in centering cutting tool carrier means for rotation relatively to the work.

Referring to the drawings:

Fig. 1 is an end elevation of an embodiment of the invention in a hand operated tool;

Fig. 2 is a view of the device of Fig. 1 from the opposite end to the showing in Fig. 1;

Fig. 3 is a side elevation of the device of Fig. 1;

Fig. 4 is a section on the line IV—IV, Fig. 2;

Fig. 5 is a section on the line V—V, Fig. 3; and

Fig. 6 is a fragmentary detail showing the cutting tool mounting.

Carrier 1 is shown provided with a plurality of radially extending seats 2 in flange or ring portion 3 from the cylindrical portion 1 of the carrier. This carrier, from the cylindrical portion has externally threaded portion 4 coacting with internally threaded portion 5 of mounting ring 6. This ring 6 has flange 7 adjacent cylindrical bearing 8, opposing which is ring 9. Between this ring 9 and flange 7 there is thus provided a channel bearing for toothed ring 10 as a ratchet or gear. Fixed in this ring 10, having externally a series of teeth 11, is a plurality of pins 12 protruding through clearance 13 between the ring or nut 9 and ring 14, assembled by screws 15 with ring 16 having overhang 17 providing a housing for this ratchet gear 10.

Openings 18 through the ring 3 have pins 12 extending therethrough. These pins 12 on their inwardly facing sides have cam portions 20 coacting with rear portions 21 of blocks 22 terminating in cutting edges 23. These blocks 22 are in the radially extending guides 2. The blocks 22 have seats 24 therein normally engaged by plunger 25, urged in seating relation therewith by leaf spring 26 anchored by rivet 27 with lug 28, in which the way 2 is located. It is thus seen that, as the threaded portions 4, 5, coact, there is effected axial movement between the member 6 and the member 1, urging the cutting tools 22 radially or toward work 29, which work may be anchored in vice 30. This actuation between the member 6 and the member 1 is effected by applied power to the ring 16. This ring 16 is loosely mounted on the ratchet gear 10 and has socket 31 in which operating arm 32 may be threaded as a detachable lever.

Adjacent this seat 31 is lug 33 in which is compression helical spring 34 acting upon shoulder 35 and surrounding stem 36 having protruding knurled head 37. Beyond this shoulder 35, the stem 36 is provided with pawl or tooth 38 to engage the ratchet teeth 11. By pulling up this stem 36 against the resistance of the spring 34 and rotating the stem 36, this tooth 38 may be located for clockwise or counterclockwise engagement in the pump handle operation of the lever 32. In clockwise engagement there is, in the right hand operated tool, the progression of the cutting dies or chasers 22 clockwise as to the work 29 and longitudinally therealong.

This mounting 6 herein is shown as having three arms 39 extending therefrom and carrying flange 40 of general triangular form and endless. At the respective apices of this triangle there is opening 41 for stem 42, passing through this triangular flange 40 and being fixed with concave shoe or seat 43. This shoe or seat 43 is shown as of a channel form with the biting edges of this concave portion on a radius less than the diameter of the minimum size work to be handled. For instance, if the minimum diameter work be 1 inch, the radius of the arc for the shoe 43 may be, say ⅜ inch. This pin 42 is shown as having graduations 44 which, as exposed through the flange 40, serve as visible indication means for the diameter of this clamp or holding device. This means that with this tool these seats or shoes 43 serve as adjustable bushing means adaptable for the range of diameters of rods or pipes for the tool, and furthermore distribute the gripping or clamping action about the work in such a way that there in an effective frictional gripping, minimizing tendency to crush or objectionably mar even copper pipes or rods.

Parallel to the stem 42 is set screw 45 having wing actuation means 46. This set screw is threaded in the flange 40 and extends to abut the shoe 43 adjacent the stem 42. Yoke 47 fixed with the stem 42 has swivel assembly with the set screw 45 so that in clockwise rotation of the wing means 46, the stem 42 may be urged axially inward toward a desired diameter for clamping the work. There is independent adjustment of these bushing sections for effecting clamping of the work in a compact, substantial and simple device.

The ways 2 are shown in an annular group of four. The tools or cutting means 22 are shown with their threaded termini 23 in a sequence for a common series. In the device as shown, range of sizes may be handled, say from 2 inches external diameter down to 1 inch in diameter for cutting threads having the pitch of the threaded portion 4. It is thus seen that for the range of common sizes of the work or cylindrical stock to be given attention, there may be adapted thereto the bushing segments or shoes 43.

What is claimed and it is desired to secure by Letters Patent is:

1. A tool embodying cutting means, a carrier for the means, a mounting providing a bearing for assembling the carrier for having axial coincidence with the mounting, adjustable work engaging means at the mounting comprising a plurality of concave seat members, means for radially adjusting said seat members including a graduated guide pin fixed with each seat member, a yoke extending from each pin, and a set screw swiveled in each yoke and operative to abut the seat member for effecting inward radial travel.

2. A tool embodying cutting means, a carrier for the means, a mounting providing a bearing for assembling the carrier for having axial coincidence with the mounting, said mounting protruding as an endless flange of triangular contour, a concave shoe adjacent each apex of the triangle, a graduation carrying stem outwardly protruding from each shoe through the triangle apex, and a set screw eccentric of and swiveled with each stem and extending through the triangle flange to abut a shoe.

3. A threading tool embodying a carrier, a mounting for the carrier, bushing segments in the mounting adjustable to a range of diameters of the tool, a guide pin fixed with each segment and slidable radially in the mounting, and a set screw parallel to each pin and rotatable in the mounting for travel with the pin, said set screw protruding through the mounting to abut the segment.

4. A tool embodying a work engaging carrier including a plurality of sections in opposing relation, one of said sections being adjustable toward and from work engaging position, said section having a stem engaged therewith, and a set screw engaging the section and the stem, said carrier providing parallel ways for the stem and screw.

5. A pipe tool embodying a pipe engaging carrier having a radially extending guide-way and parallel thereto a threaded way, a pipe gripping section having a stem fixed therewith extending through the radially extending guide-way, a set screw in a threaded way extending to abut the section in inward shifting of the section, and a yoke connection between the stem and set screw effective to withdraw the section in backing off the set screw.

WAYNARD R. VOSPER.